United States Patent
Altrichter

(10) Patent No.: US 10,641,906 B2
(45) Date of Patent: May 5, 2020

(54) GPS JAMMER AND SPOOFER DETECTION

(71) Applicant: BAE SYSTEMS INFORMATION AND ELECTRONIC SYSTEMS INTEGRATION INC., Nashua, NH (US)

(72) Inventor: Wayne W Altrichter, Chatham, NJ (US)

(73) Assignee: BAE Systems Information and Electronic Systems Integrations Inc., Nashua, NH (US)

( * ) Notice: Subject to any disclaimer, the term of this patent is extended or adjusted under 35 U.S.C. 154(b) by 526 days.

(21) Appl. No.: 15/277,625

(22) Filed: Sep. 27, 2016

(65) Prior Publication Data

US 2018/0088241 A1    Mar. 29, 2018

(51) Int. Cl.
| | |
|---|---|
| G01S 19/21 | (2010.01) |
| G01S 19/26 | (2010.01) |
| G01S 19/18 | (2010.01) |
| G01S 19/49 | (2010.01) |
| G01S 19/33 | (2010.01) |
| G01S 19/47 | (2010.01) |

(52) U.S. Cl.
CPC ............ *G01S 19/215* (2013.01); *G01S 19/18* (2013.01); *G01S 19/21* (2013.01); *G01S 19/26* (2013.01); *G01S 19/33* (2013.01); *G01S 19/47* (2013.01); *G01S 19/49* (2013.01)

(58) Field of Classification Search
CPC ........ G01S 19/215; G01S 19/18; G01S 19/21; G01S 19/26; G01S 19/33; G01S 19/47; G01S 19/49

USPC ............ 342/357.59, 357.56, 357.65, 357.73, 342/357.3, 357.32; 701/474

See application file for complete search history.

(56) References Cited

U.S. PATENT DOCUMENTS

| | | | | |
|---|---|---|---|---|
| 6,377,892 | B1* | 4/2002 | Johnson | G01C 21/00 342/357.31 |
| 6,917,644 | B2* | 7/2005 | Cahn | G01C 21/26 370/320 |
| 7,181,247 | B1* | 2/2007 | Melick | G01S 19/10 342/357.29 |
| 7,310,062 | B1* | 12/2007 | Hwang | G01S 19/215 342/357.59 |
| 8,446,310 | B2* | 5/2013 | Law | H04K 3/22 342/13 |
| 8,922,427 | B2* | 12/2014 | Dehnie | G01S 19/47 342/357.3 |
| 8,965,276 | B2* | 2/2015 | Bongfeldt | H01Q 1/1242 343/878 |
| 9,466,881 | B1* | 10/2016 | Berry | G01S 19/03 |

(Continued)

OTHER PUBLICATIONS

PCT Search Report for Appl No. PCT/US17/52249 dated May 14, 2018, 11 pages.

*Primary Examiner* — Chuong P Nguyen
(74) *Attorney, Agent, or Firm* — Maine Cernota & Rardin; Scott J. Asmus

(57) ABSTRACT

A method for determining the presence of interference on a GPS receiver is described. The method involves monitoring global positioning system data received by a receiver under known non-interfering conditions, storing the data for analysis and, at a later time, comparing the data, over a period of time, with the position output of a pure inertial navigation system to determine the presence of characteristics indicating interference.

19 Claims, 9 Drawing Sheets

(56) References Cited

U.S. PATENT DOCUMENTS

| | | | |
|---|---|---|---|
| 9,541,626 B2* | 1/2017 | Melick | G01S 19/11 |
| 10,054,687 B2* | 8/2018 | Whitehead | G01S 19/20 |
| 10,073,179 B2* | 9/2018 | Driscoll | G01S 19/49 |
| 2001/0002203 A1* | 5/2001 | Cahn | G01C 21/26 |
| | | | 375/142 |
| 2003/0058927 A1 | 3/2003 | Douglas et al. | |
| 2007/0241886 A1* | 10/2007 | Breeding | G01C 19/66 |
| | | | 340/539.13 |
| 2009/0140921 A1* | 6/2009 | Bongfeldt | H01Q 1/1242 |
| | | | 342/372 |
| 2009/0254278 A1 | 10/2009 | Wang | |
| 2010/0039318 A1 | 2/2010 | Kmiecik et al. | |
| 2011/0068973 A1 | 3/2011 | Humphreys | |
| 2013/0002477 A1* | 1/2013 | Dehnie | G01S 19/215 |
| | | | 342/357.3 |
| 2014/0022121 A1* | 1/2014 | Donovan | G01C 21/165 |
| | | | 342/357.49 |
| 2015/0226858 A1* | 8/2015 | Leibner | G01S 19/215 |
| | | | 342/357.59 |
| 2015/0234053 A1 | 8/2015 | Psiaki et al. | |
| 2015/0268350 A1* | 9/2015 | Whitehead | G01S 3/46 |
| | | | 342/357.59 |
| 2016/0282473 A1* | 9/2016 | Driscoll | G01S 19/49 |
| 2016/0370469 A1* | 12/2016 | Mabuchi | G01S 19/215 |
| 2016/0377726 A1* | 12/2016 | Schipper | G01S 19/29 |
| | | | 342/357.59 |
| 2017/0090036 A1* | 3/2017 | Zalewski | G01S 19/215 |
| 2017/0322313 A1* | 11/2017 | Revol | G01S 19/08 |

* cited by examiner

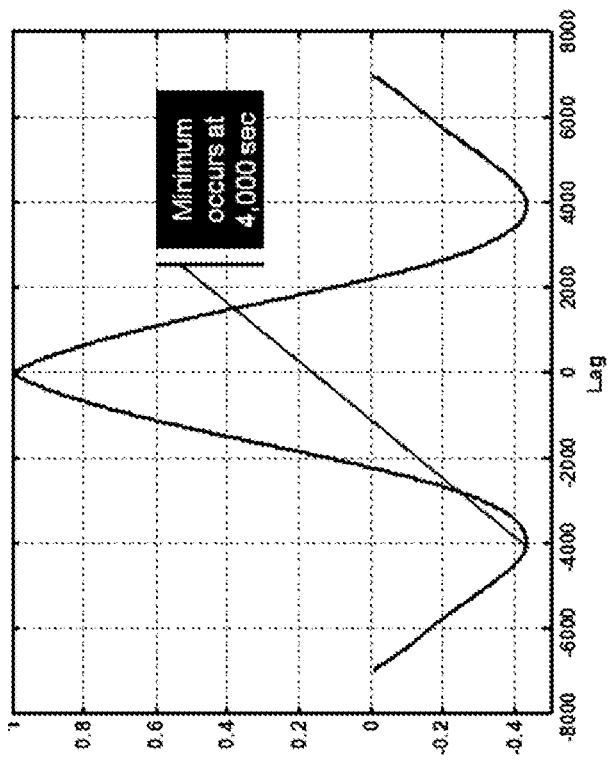
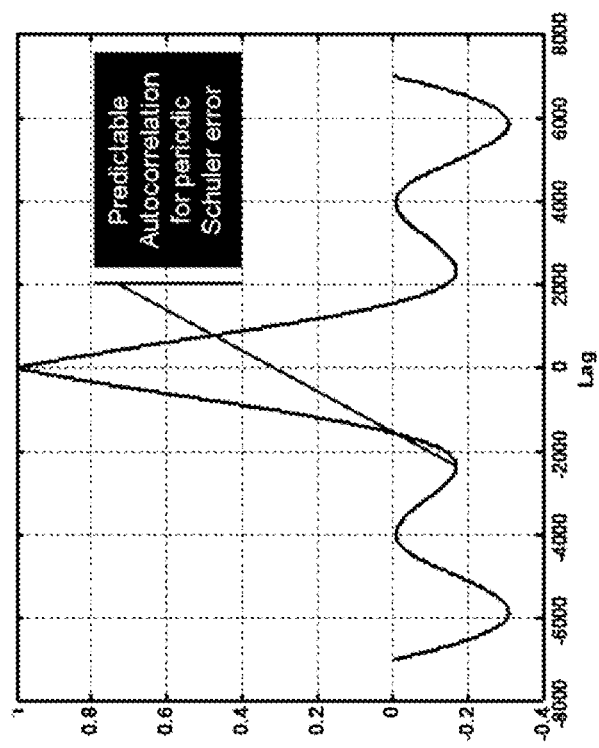
Figure 3B
Figure 3A

GPS JAMMER AND SPOOFER DETECTION

FIELD

The present disclosure relates to Global Positioning Systems (GPS), and more particularly, to a system for the detection of GPS jamming and spoofing.

BACKGROUND

Most existing tactical systems rely, directly or indirectly, on the presence of accurate GPS data for navigation and positioning, at least in part. A mobile unit, for instance, will typically integrate GPS data with that generated by an onboard Inertial Navigation System (INS) to produce an integrated GPS/INS solution. A stationary unit may utilize GPS to establish its fixed position.

An Inertial Navigation System, such as that used on the mobile units discussed above, is a navigation aid that uses a computer, motion sensors (e.g. accelerometers) and rotation sensors (e.g. gyroscopes) to continuously calculate, via dead reckoning, the position, orientation, and velocity (direction and speed of movement) of a moving object without the need for external references, such as GPS data. Such a system generally requires information regarding the starting position, velocity and orientation to be known to provide usable data. Such INSs are also susceptible to drift, as errors in estimates compound and accumulate over time.

Global Positioning Systems, since they are not susceptible to drift errors, due to their lack of reliance on previous estimates in updating positional data, are often used in conjunction with INS to provide robust position and velocity data. GPS, however, is susceptible to experiencing signal loss or corruption due to terrain and other variables, which may result in the GPS providing inaccurate information or ceasing to function entirely in some conditions. During these periods, the INS can be used to mitigate this loss of GPS data.

A major concern by all users of GPS technology, however, is the relative susceptibility of the GPS signal to intentional interference, such as may be encountered during wartime operations. It has been demonstrated that very inexpensive and simple hardware can be effectively used to deny platforms access to the GPS signal (jamming) and an increasingly serious threat exists in the development of means to interfere in a way that makes a GPS receiver produce erroneous results (spoofing).

Many of the current methods for the detection and/or mitigation of intentional GPS interference (jamming and spoofing) are based on the signal properties and antennae technology available for enhancing GPS receivers. For example, antennae-nulling, where an antenna is adjusted such that its dead zone, or zone of reduced sensitivity, encompasses a source of interference, is one option that is used to minimize the effects of jamming. Antennae-nulling must be performed by the transmitting platform and, dependent on the location of the source(s) of interference and their position relative to the intended receiver, may not be capable of sufficiently attenuating the interference. Especially in cases where the source of interference is relatively close to the intended recipient of the signal, antennae-nulling may result in severe signal loss to the intended recipient.

A second option for the detection and/or mitigation of intentional GPS interference involves enhanced signal processing techniques, which are used to increase the anti-jam capabilities of GPS receivers. Such techniques, however, are computationally expensive. The US Government has also introduced a 3rd GPS frequency for the purpose of enabling the use of enhanced GPS receivers that would minimize their sensitivity to interference signals, this technique, however, requires receivers to be capable of receiving and processing the new frequency, resulting in integration of this technology being time consuming and expensive.

Although the problems described above were described primarily in the context of military and tactical situations, GPS interference is a problem for both military and commercial applications.

What is needed, therefore, are techniques for detecting and overcoming jamming and spoofing that do not require modification of the underlying hardware and that are not computationally expensive.

SUMMARY

One embodiment of the present disclosure provides a system for, detecting signal interference in a positioning system, the system comprising: an interface capable of linking at least two separate navigation systems to a processor; an inertial navigation system coupled to the interface; a global positioning system receiver in operative communication with at least one other global positioning system receiver and coupled to the interface; a processor coupled to the interface; a memory storage device coupled to the processor, the memory storage device including instructions that cause the processor to compute at least one sampled-autocorrelation function for determining the presence of interference, based on a comparison of inertial navigation system provided positions and global positioning system provided positions at various times.

Another embodiment of the present invention provides such a system wherein an alert is displayed to a user upon the detection of global positioning system interference.

A further embodiment of the present invention provides such a system wherein the interface comprises a link 16 tactical data network.

Yet another embodiment of the present invention provides such a system wherein the system is incorporated into a mobile warfighting unit.

A yet further embodiment of the present invention provides such a system wherein the system is incorporated into a stationary warfighting unit.

Still another embodiment of the present invention provides such a system wherein the system is incorporated into a civilian airliner.

A still further embodiment of the present invention provides such a system wherein Integrated Data Registration software is stored on the memory storage device and is used to provide the medium for instructions that cause the processor to compute at least one sampled-autocorrelation function for determining the presence of interference, based on a comparison of inertial navigation system provided positions and global positioning system provided positions at various times.

Even another embodiment of the present invention provides such a system wherein the instructions that cause the processor to compute at least one sampled-autocorrelation function for determining the presence of interference detect interference by searching for histogram bins where the auto-correlation function or a power spectrum function exceeds a threshold that, normally, would not be present without interference.

One embodiment of the present invention provides a method for determining the presence of interference on a GPS receiver, the method comprising: monitoring global positioning system data received by a receiver under known non-interfering conditions; storing the data for analysis on a storage means; and at a later time, comparing the data, over a period of time, with the position output of a pure inertial navigation system to determine the presence of characteristics indicating interference.

Another embodiment of the present invention provides such a method wherein the characteristics indicating interference comprise a shifting in time of regularly reoccurring minima and/or maxima in the data.

A further embodiment of the present invention provides such a method wherein the step of comparing comprises computing at least one sampled-autocorrelation function for determining the presence of interference, based on a comparison of inertial navigation system provided positions and global positioning system provided positions at various times.

Yet another embodiment of the present invention provides such a method wherein the characteristics comprise deterministic qualities of the INS data.

A yet further embodiment of the present invention provides such a method wherein the deterministic qualities comprise Schuler and earth-loop errors.

Still another embodiment of the present invention provides such a method wherein high-fidelity error models of inertial navigation system operation are used to define how the navigation system behaves under normal operating conditions, thereby providing the means to observe when the system is operating abnormally.

One embodiment of the present invention provides a method for determining the presence of interference on a GPS receiver, the method comprising: differencing inertial navigation system position data with a truth reference; comparing the differenced data with pure inertial navigation system data; evaluating "spectral" content, or equivalently an autocorrelation function, for the computed position differences between the pure INS position and truth reference; using either the autocorrelation or power spectrum outputs, evaluating the data to detect the presence of interference.

Another embodiment of the present invention provides such a method wherein the sampled autocorrelation functions is computed for both latitude and longitude.

A further embodiment of the present invention provides such a method wherein an equivalent representation in the frequency domain utilizes the sampled power spectral density functions for latitude and longitude.

Yet another embodiment of the present invention provides such a method wherein algorithms are used to compute autocorrelation functions for the position errors of pure inertial navigation system data based on the comparison of inertial navigation system position data with global positioning system position data.

A yet further embodiment of the present invention provides such a method wherein the truth reference is a global positioning system receiver and associated position data.

Still another embodiment of the present invention provides such a method wherein the step of using either the autocorrelation or power spectrum outputs, evaluating the data to detect the presence of interference comprises searching for histogram bins where the auto-correlation or power spectrum functions exceed a threshold that, normally, would not be present without interference.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

BRIEF DESCRIPTION OF THE DRAWINGS

FIG. 3A is a graph showing an autocorrelation function of GPS without interference, in accordance with one embodiment of the present disclosure;

FIG. 3B is a graph showing an autocorrelation function of GPS with interference, in accordance with one embodiment of the present disclosure;

DETAILED DESCRIPTION

Figure 1:
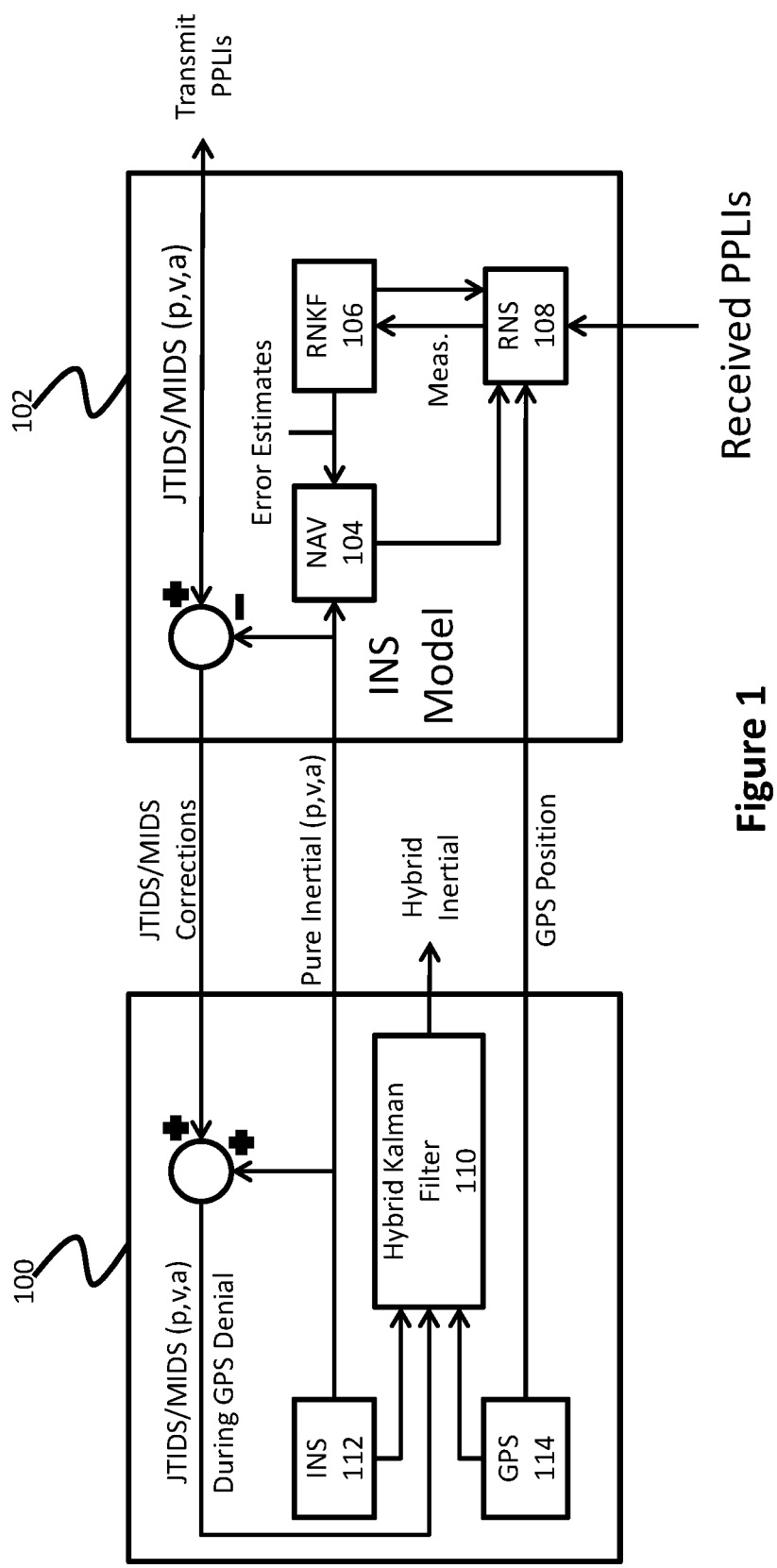
FIG. 1 is a block diagram illustrating a GPS & INS interface with a Link 16 terminal, configured in accordance with one embodiment of the present disclosure.

As laid out above, GPS and INS, on critical systems, are typically used in conjunction, since INS errors tend to accumulate over time due to a reliance on previous estimates while GPS errors, due to their non-reliance on previous estimates, tend to produce accurate results within a certain threshold of error, although maintaining a GPS signal can be difficult in certain terrain. This combination allows accurate positional and velocity information to be obtained from the INS, regardless of the presence of external data, with the INS's accumulation of error limited by periodic updates from the GPS system, when available.

GPS systems, however, being reliant on external signals for their operation may be intentionally interfered with, either to prevent signal reception (jamming) or alter it in an effort to cause the receiver to provide inaccurate location data (spoofing). Where jamming occurs, the INS may be sufficient to continue to provide reasonably accurate positional and velocity for some time, although notification of such interference to the user would be desirable to allow the user to take action to avoid the interference. Where spoofing occurs, however, the INS may be updated with the new, incorrect information, potentially resulting in inaccurate position and velocity information being provided to and relied on by the user.

The first step in protecting GPS receivers from interference sufficient to cause degraded operation is the detection of the presence of such interference. High-fidelity error models for INSs may be used to define how navigation systems behave under normal operating conditions, thereby providing the means to observe when these systems are operating abnormally. Specifically, the monitoring and analysis of GPS position data and the subsequent comparison of that data with the position output of a pure INS, i.e. one that has not been corrected, algorithmically or otherwise, may be used to detect the presence of GPS jamming or spoofing types of interference.

Specifically, software may be used to compute a sampled-autocorrelation function over time for the position errors of a pure INS based on the comparison of the INS positions and the GPS positions. Here, the term "autocorrelation," which may also be referred to as "serial correlation," is used to refer to the correlation of a signal with itself at different points in time. It may also be thought of as the similarity between observations as a function of the time lag between them.

Usefully, the positional error of a pure INS has deterministic properties, e.g. Schuler and Earth-Loop errors. Schuler errors, which include earth loop errors, in INSs are caused by the curvature of the earth, which results in an approximately 84.4-minute oscillation in the INS data. Because of these deterministic properties and their associated periodic errors, which are not reliant on or caused by external data, the INS system may be used to detect GPS interference using the sample-autocorrelation function described in the preceding paragraph. Such a system, because it does not depend on external signals for operation, is also itself immune to jamming or spoofing attacks.

When an error caused by interference is present in a GPS-provided position, the INS-GPS position differences will include the additional deterministic error characteristics, which may be detected by observing the output of the sampled-autocorrelation function, e.g., FIGS. 3A and 3B.

Conveniently, the necessary INS and GPS data is readily available within the tactical systems of a relatively modern mobile warfighter. Stationary units may also use benefit from technique, with implementation on such a platform often being simpler than on a mobile unit since the position error of a stationary unit can be assumed to be static (a bias). Once the detection has been confirmed the warfighter tactical systems may avoid or mitigate the GPS interference.

A significant advantage of the proposed approach presented here over those of the prior art, as discussed above, is that the detection of interference, in accordance with embodiments of the present disclosure, may be provided entirely by software implementation. This is possible because the required inputs are already readily available in the existing GPS and INS navigation systems implementations onboard aircraft, ships, and ground units. The significance of this approach is the use of the properties of the INS errors (Shuler characteristics) which are immune to external interference (jamming). That is, the sampled-autocorrelation function or its Fourier Transform, the Power Spectral Density implemented in software may be used to determine when the GPS minus INS position errors are corrupted. Without interference, GPS-INS will always appear as pure Shuler errors. With interference, the GPS-INS will include interference error characteristics.

In such a software implementation, an algorithm or algorithm may be stored on a storage device, such as a hard drive, that is in communication with a memory device, such as DDR3 memory, that is in further communication with a central processing unit (CPU) or processor. The storage device and memory may also be used to store INS and GPS data.

The above-described capability permits warfighting units, as well as units having civilian purposes, to detect navigation errors introduced by the jamming or spoofing of its on-board GPS equipment. Warfighting and civilian units may use the capability offered by a system configured in accordance with embodiments of the present disclosure to make critical navigation system decisions, avoid detrimental performance of navigation systems, and utilize alternate navigation sources when GPS is degraded.

Now referring to FIG. 1, the GPS jamming and spoofing detection system described herein is shown implemented in a typical Link 16 (a military tactical data exchange network used primarily by the US and North Atlantic Treaty Organization, i.e. NATO) terminal integration 102 with the embedded GPS/INS 100 of a warfighting unit, using a data exchange, in accordance with embodiments of the present disclosure. In this figure, the acronym JTIDS is used to refer to a Joint Tactical Information Distribution System, an L band Time Division Multiple Access (TDMA) network radio system used by the United States armed forces and their allies to support data communications needs, principally in the air and missile defense community. The acronym MIDS is used to refer to a Multifunctional Information Distribution System, MIDS being the NATO term for the communication component of a Link-16 network. The element labeled RNKF 106 is a RELNAV Kalman Filter, where RELNAV is used to refer to Relative Navigation, Timing & Data. The element labeled RNS 108 is a RELNAV Source Selection function. Lastly, PPLI is used to refer to the Precise Participant Location and Identification messages exchanged in a Link 16 network, which communicates the precise location and identities of everyone in the Link 16 network. These PPLIs result in an alternate source (relative to GPS) of position information allowing Link 16 participants to navigate with respect to WGS-84.

In the Link 16 terminal 102 integration with the embedded GPS/INS 100 of a warfighting unit, using a data exchange, shown in FIG. 1, referring specifically to the Link 16 terminal 102, received PPLIs are received and processed by the RNS module 106. The RNS module 106 is in operative, two-way communication with the RNKF module 104. The RNKF module 104 is in further operative communication with the NAV module 102, where error corrections are sent from the RNKF module 104 to the NAV module 102. Error estimates may be provided by the system after processing of the data by the RNKF module 104. The NAV module may further receive and process pure inertial data from an INS module 112 of an embedded GPS/INS system 100. The INS module 112 data may also be combined with transmit PPLI data of the Link 16 terminal 102, which may be provided to the embedded GPS/INS system 100 data and recombined with the INS module 112 data. The INS module 112 data may also be provided, along with GPS module 114 and JTIDS/MIDS data, into a Hybrid Kalman Filter 110, resulting in the provision of hybrid inertial data. The GPS module 114 data may also be provided, along with NAV module 104 data, to the RNS module 108 for processing.

A similar interface exists within Integrated Data Registration (IDR) software that is often used in such units, which could also be used to provide the medium for these GPS interference detection algorithms. IDR is described in commonly-owned patent application Ser. No. 14/350,585 and PCT/US13/54248, which are incorporated herein by reference. One of ordinary skill in the art, using the information contained herein, would be able to implement such a solution on an IDR.

Figure 5A:
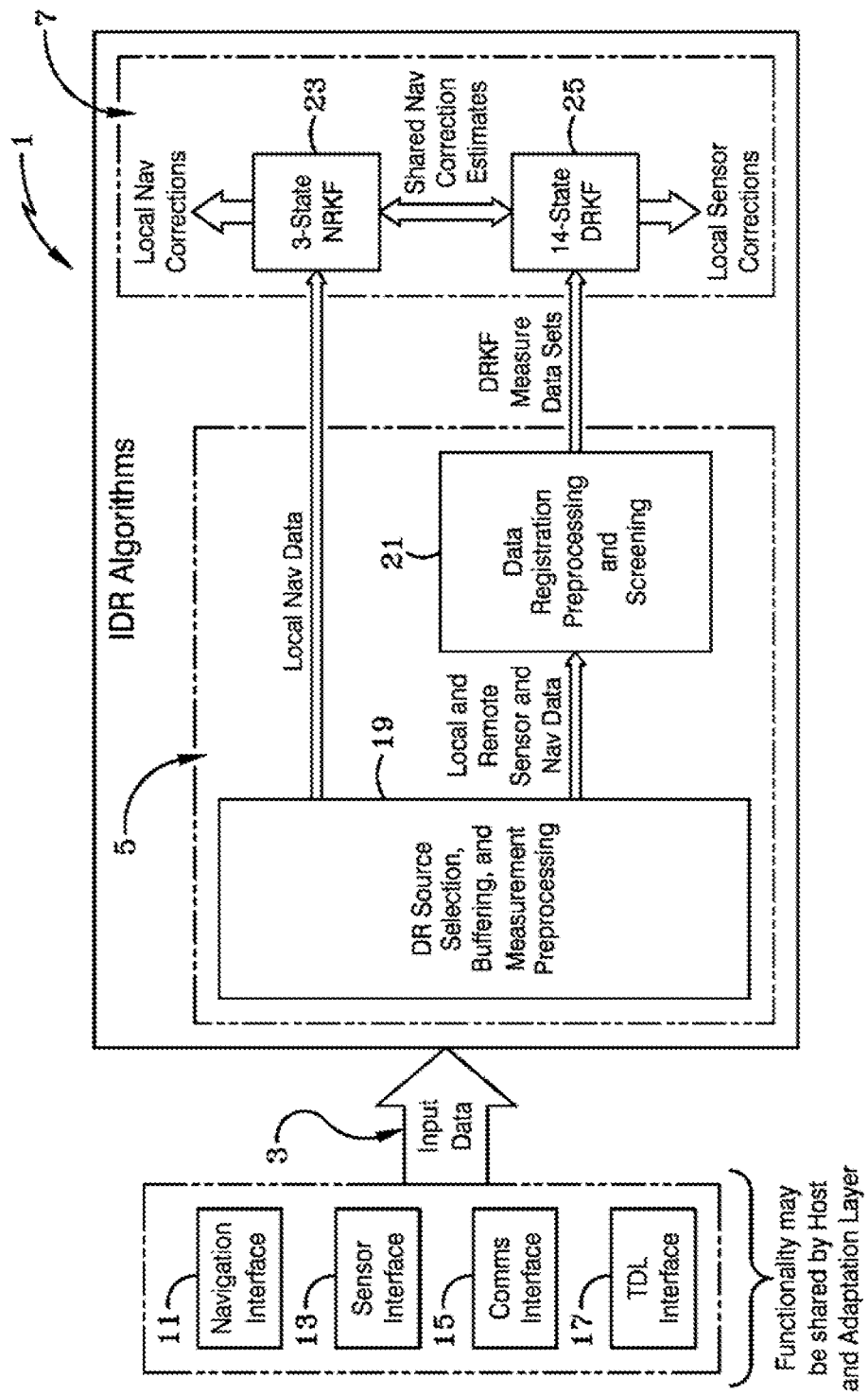
FIG. 5A illustrates a schematic representation of an embodiment of a system implementing integrated data registration (IDR)

FIG. 5A illustrates an example IDR system 1 as a high-level architecture of the IDR algorithms. This architecture allows the design to be suitable for a wide variety of tactical systems. One embodiment of the system 1 is a collection of algorithms that perform the fundamental time, navigation, and sensor registration processing required to geodetically and relatively align data for a variety of navigation and sensor systems using available navigation and sensor reference data sources. Embodiments of the system 1 include an input interface 3, data registration and buffering logic 5, and filter logic 7. As discussed further below, the input interface can receive navigation and sensor data from a variety of sources. For example, it can receive navigation data from a navigation interface 11, receive sensor data (for example radar data) from a sensor interface 13, receive remote data from remote units from a communication (corns) interface 15 and receive Link 16 Precise Participant Location and Identification (PPLI) messages over a TDL interface 17. "Logic", as used herein, includes but is not limited to hardware, firmware, software and/or combinations of each to perform a function(s) or an action(s), and/or to cause a function or action from another logic, method, and/or system. For example, based on a desired application or needs, logic may include a software controlled microprocessor, discrete logic like an application specific integrated circuit (ASIC), a programmed logic device, a memory device containing instructions, or the like. Logic may include one or more gates, combinations of gates, or other circuit components. Logic may also be fully embodied as software. Where multiple logics are described, it may be possible to incorporate the multiple logics into one physical logic. Similarly, where a single logic is described, it may be possible to distribute that single logic between multiple physical logics.

As illustrated, the data registration and buffering logic 5 may contain logic and/or software to perform data registration (DR) source selection, buffering and measurement preprocessing 19 as well as data registration preprocessing and screening logic 21. The filter logic 7 can contain a navigation filter 23 and a sensor filter 25. The navigation filter 23 can be a 3-state NRKF filer and the sensor filter 25 can be a 14-state DRKF filter. A shared navigation corrections estimates bus can be connected between these two filters so that correction data can be shared.

Figure 5B:
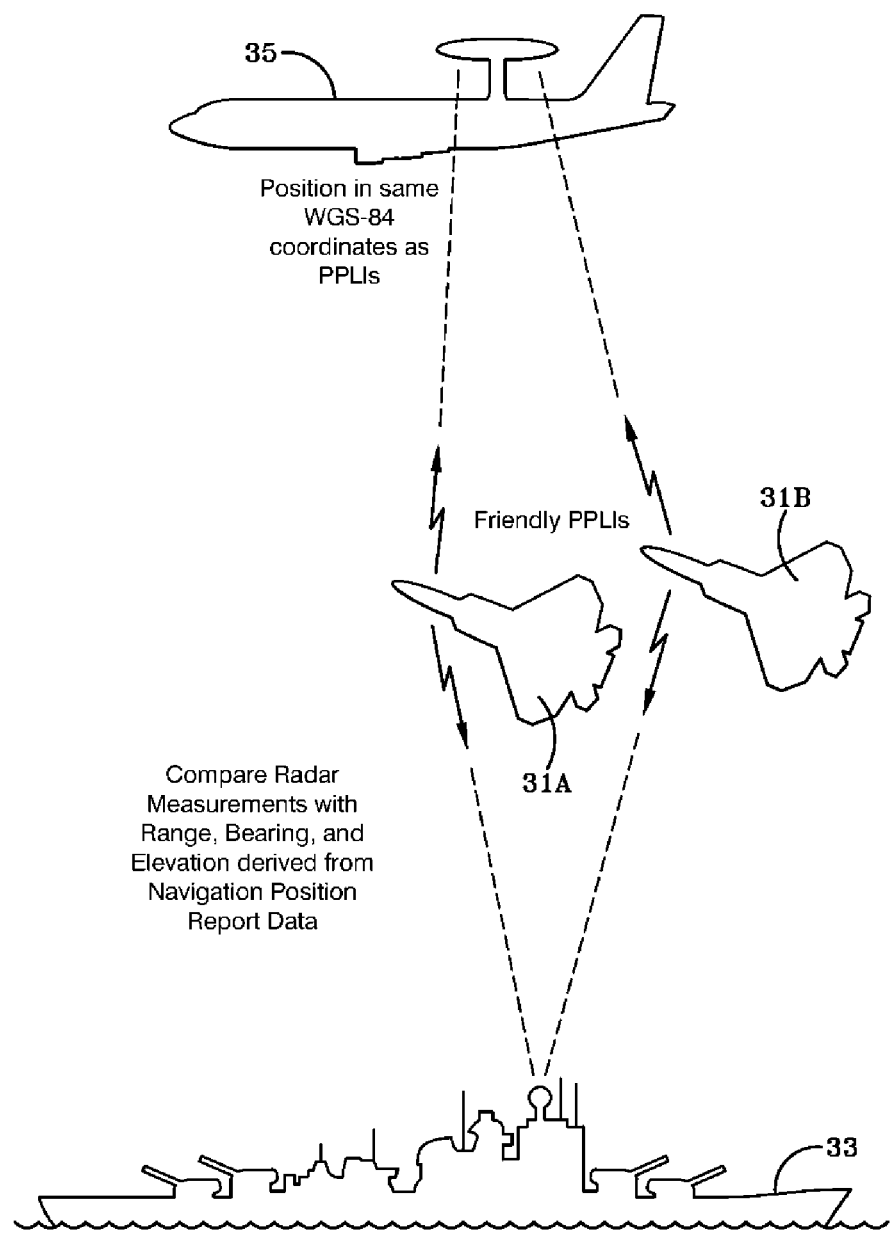
FIG. 5B illustrates the comparing of radar measurements when two friendly aircraft provide precise participant location and identification (PPLI) messages to an IDR system.
Figure 5C:
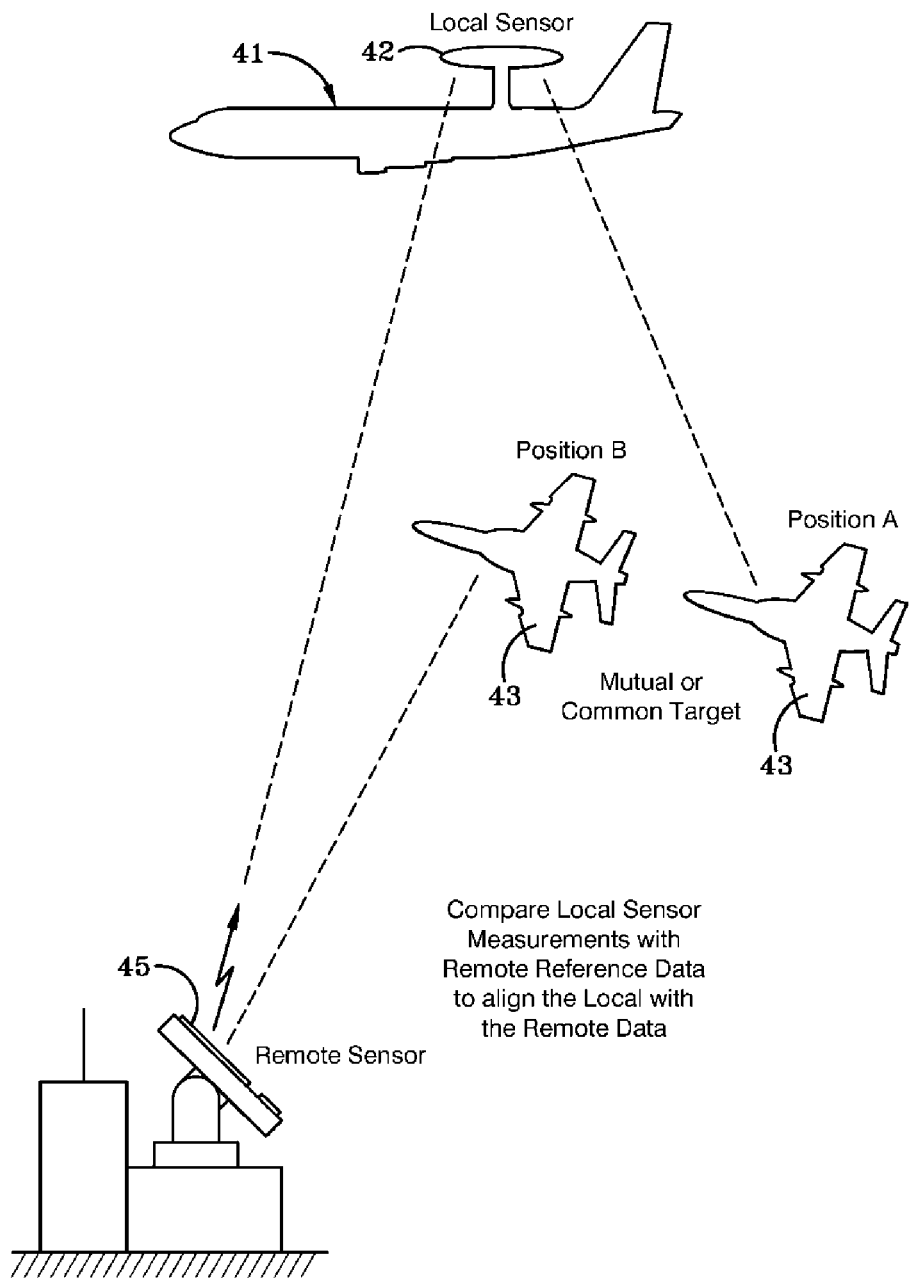
FIG. 5C illustrates the IDR concept using mutual/common target objects.

The IDR algorithms utilize any Self-Reported Objects (SROs) within the communication or Tactical Data Link (TDL) networks available. For example, the TDL Link 16 Precise Participant Location and Identification (PPLI) messages are SROs that are periodically transmitted and include the WGS-84 position of each Link 16 network participant. The Identification Friend or Foe (IFF) Mode S Extended Squitter, and the IFF Mode 5 Level 2 systems also provide position reports that serve as SROs. The IDR concept of using SROs to achieve a data registration solution is displayed in FIG. 5B. In this figure, two friendly Link 16 network participants each send PPLI messages to a remote ship 33 and an airborne warning and control system (AWACS) airplane 35 so that radars in ship 33 and AWACS plane 35 can be more accurately calibrated. Referring to FIG. 5C, an embodiment of the IDR system 1 can be implemented to utilize common (or mutual) target observations from multiple local or remote sensors to estimate data registration errors. The fully integrated treatment of data registration—geodetic sensor registration, navigation registration, and time registration—utilizing self-reporting object data as well as measurements from Common Air Objects (CAOs), results in the capability of the IDR system. In the implementation of FIG. 5C, an IDR system 1 can be implemented in a local AWACS airplane 41. It can have a local sensor 42 that it uses to locate a target 43 that it believes is at position A. An IDR system 1 in the AWACS airplane 41 can receive position information from a remote sensor 45 that determines the location of the common target at position B. Knowing that the remote sensor 45 has more accurate data of the location of the target 43, the AWACS 41 can (through its IDR system 1) compensate and/or calibrate values of its local sensor 42 so that it can now more accurately find objects with its local sensor 42.

The Time Registration errors modeled in the IDR algorithms are comprised of residual time bias errors that may be present in local sensor measurements. The IDR processing estimates these errors and provides the means to remove them. The IDR algorithms employ the combination of inertial navigation system (INS), global positioning system (GPS), and Link-16 navigation data to provide direct measurements for the estimation of the navigation registration errors for the local unit using a Navigation Registration Kalman Filter (NRKF). The NRKF also incorporates navigation position error measurements derived from Common Air Objects (CAOs) (i.e., measurements from multiple sensors used to update the track of a single object) between local and remote sensors. Sensor measurement bias errors (range, azimuth, elevation, and Doppler), and aperture alignment bias errors (the aperture orientation angles) relative to the body-frame of the local unit, are the primary sensor errors contributing to biased sensor measurement reports. Estimation and correction of these sensor bias errors is desired, since measurement accuracy ultimately determines the performance of vital tracking algorithms such as track-to-track correlation, measurement-to-track association, and critical downstream processing functionality such as combat identification (ID) and engagement planning/prosecution. In the preferred embodiment, the IDR algorithms estimate and remove these critical biases to align the sensor measurements to the WGS-84 reference frame and UTC (USNO) time standard. The IDR algorithms account for the fact that the sensor registration corrections applied to a given measurement are generally a function of the position of each measurement relative to the sensor aperture, i.e., the corrections are not simply constant offsets across the entire field-of-view (FOV) of the sensor aperture but vary with the position of the object relative to the aperture. The ability of the IDR algorithms to use SRO and CAO measurements to estimate and remove these complex errors inherent in all sensor systems offers a significant degree of accuracy and robustness in data registration performance.

Figure 5D:
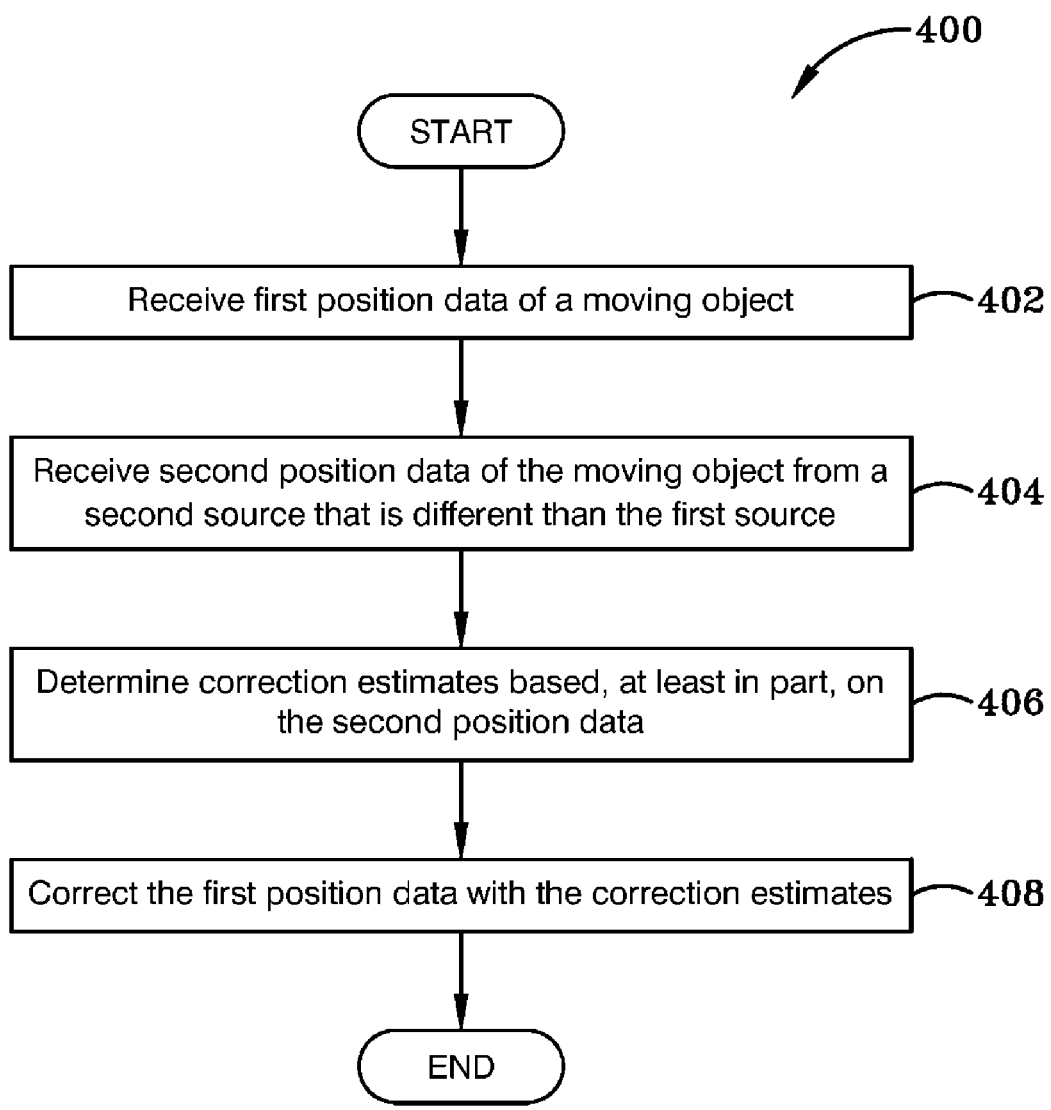
FIG. 5D illustrates an embodiment of a method for using IDR.

Example IDR methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks. FIG. 5D illustrates a method 400 of Integrated Data Registration (IDR). The method 400 includes receiving a first position data of an object, at 402, from a first source that is remote from the object. A second position data of the object is then received, at 404, from a second source that is different than the first source and that is determined independently from the first position data. The first position data can be at least partly generated by a first aperture and the second position data can be generated by a second aperture. Correction estimates are determined, at 406, based, at least in part, on the second position data. These estimates can be determined as discussed earlier. The first position data is then corrected with the correction estimates, at 408. This can be performed as discussed above and results in the first aperture now being able to make more accurate measurements.

Figure 2:
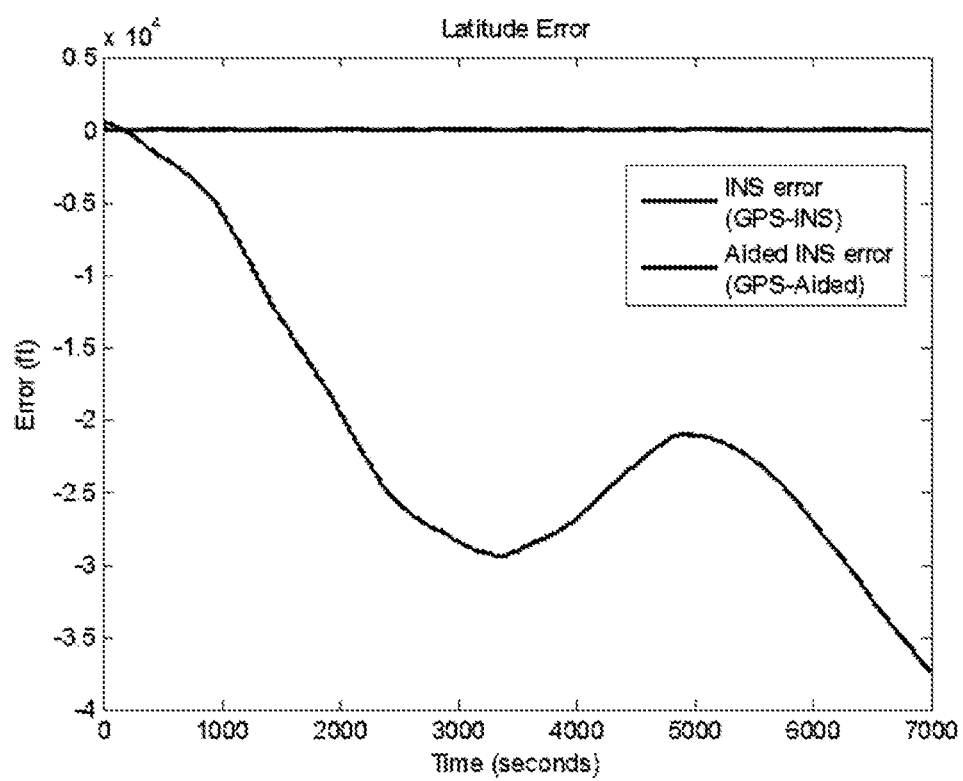
FIG. 2 is a graph showing typical INS latitude position error, in accordance with one embodiment of the present disclosure.

Now referring to FIG. 2, a plot of error v. time for a pure INS (see sinusoidal portion of graph) and for a GPS-aided INS (see relatively flat line on graph) is shown. From this graph, it can be seen that the position errors for a pure INS exhibit deterministic sinusoidal characteristics that are not subject to jamming, as previously discussed. Specifically, all INS position outputs contain a Schuler (84.4-minute) sinusoidal error and an Earth-Loop (24 hour) sinusoidal error as shown in the sinusoidal curve of FIG. 2. As such, these known characteristics may be used to identify the presence of other errors when the INS position is compared with the GPS reference position. That is, when the INS position is differenced with a "truth" reference such as GPS, the differences are expected to be consistent with the sinusoidal curve. When the INS is aided by an accurate GPS receiver, the position errors of the Hybrid GPS/INS solution should approximate the "true" position. If the GPS output is degraded, then the Hybrid GPS/INS position will deviate from the "true" position. Hence, we may use these properties to detect the presence of degraded GPS position by evaluating the "spectral" content, or equivalently the autocorrelation function for the computed position differences between the pure INS position and either the GPS position or the Hybrid GPS/INS position.

As INS-GPS position difference data is collected, the sampled autocorrelation function may be computed for both latitude and longitude. An equivalent representation in the frequency domain would utilize the sampled power spectral density function for latitude and longitude errors. Then, after a sufficient quantity of data has been collected (since the INS and GPS were both operational), the algorithm results, using either the autocorrelation or power spectrum outputs, may be evaluated to detect the presence of interference. In embodiments, the software is configured to search for histogram bins where the auto-correlation or power spectrum functions exceed a threshold that, normally, would not be present without interference.

Now referring to FIGS. 3A and 3B, the corresponding autocorrelation functions for the position errors without and with GPS interference, respectively, are illustrated.

Figure 4B:
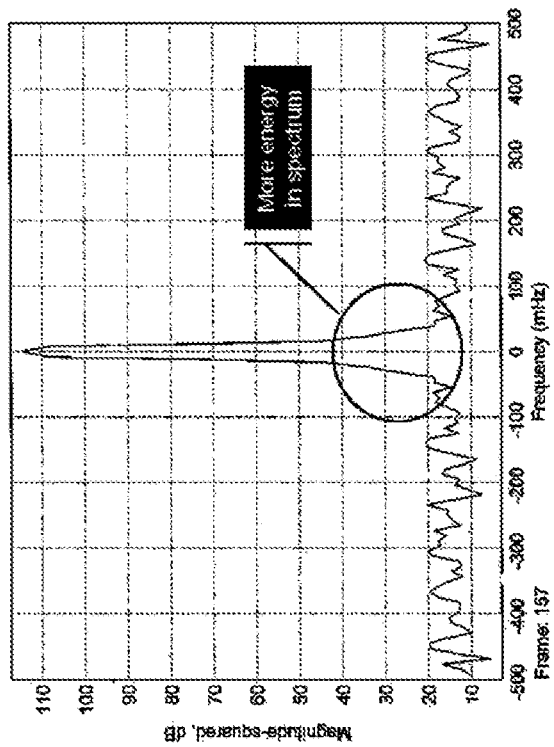
FIG. 4B is a graph showing power spectral density of GPS with interference, in accordance with one embodiment of the present disclosure.
Figure 4A:
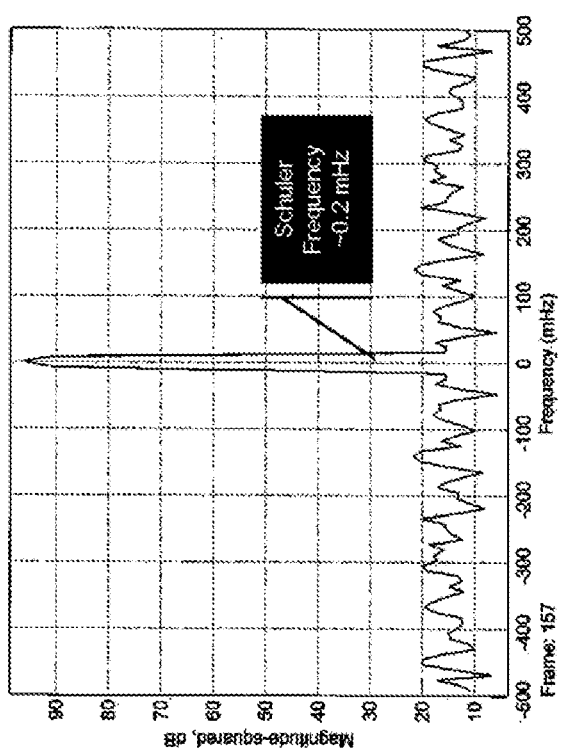
FIG. 4A is a graph showing power spectral density of GPS without interference, in accordance with one embodiment of the present disclosure.

Now referring to FIGS. 4A and 4B, the corresponding results for the power spectral density of the position errors without and with GPS interference, respectively, are illustrated.

Figure 6:
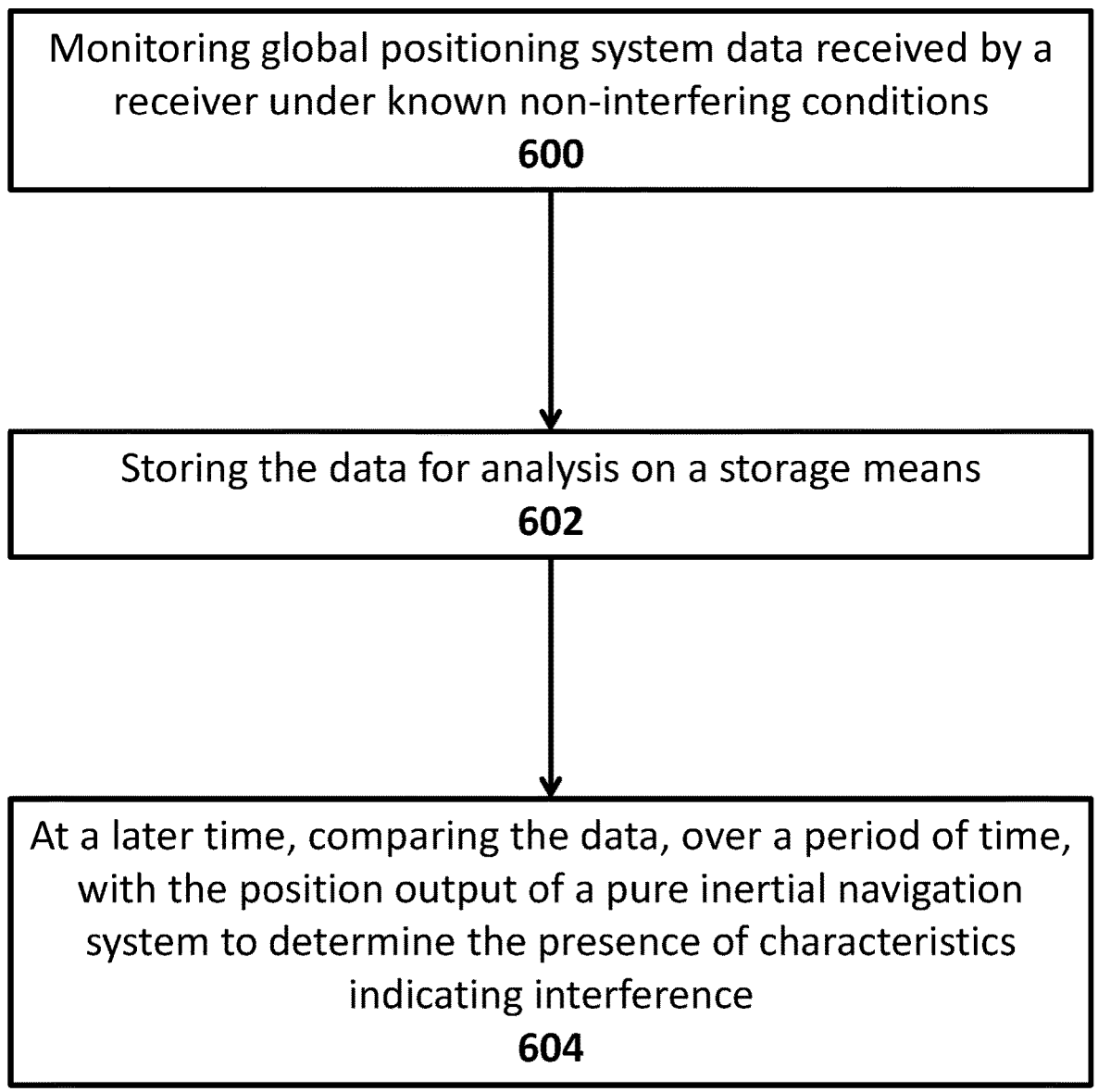
FIG. 6 is a flowchart describing a method for determining the presence of interference in a GPS receiver, in accordance with one embodiment of the present disclosure.

Now referring to FIG. 6, a flowchart describing a method for determining the presence of interference in a GPS receiver, in accordance with one embodiment of the present disclosure, is provided. More specifically, the method for determining the presence of interference in a GPS receiver comprises monitoring global positioning system data received by a receiver under known non-interfering conditions 600; storing the data for analysis on a storage means 602; and at a later time, comparing the data, over a period of time, with the position output of a pure inertial navigation system to determine the presence of characteristics indicating interference 604.

The foregoing description has been presented for the purposes of illustration and description. It is not intended to be exhaustive or to limit the disclosure to the precise form disclosed. Many modifications and variations are possible in light of this disclosure. It is intended that the scope of the disclosure be limited not by this detailed description, but rather by the claims appended hereto.

What is claimed is:

1. A system for detecting interference in a positioning system, the system comprising:
    an interface capable of linking at least two separate navigation systems;
    an inertial navigation system coupled to the interface;
    a global positioning system receiver coupled to the interface;
    a processor coupled to the interface; and
    a memory storage device coupled to the processor, wherein the memory storage device includes instructions that cause the processor to compute at least one sampled-autocorrelation function for determining error characteristics indicating intentional global positioning system interference, based on a comparison of inertial navigation system provided positions and global positioning system provided positions at various times,
    wherein the instructions that cause the processor to compute the at least one sampled-autocorrelation function for determining the intentional global positioning system interference is performed by binning results of at the least one sampled-autocorrelation function or a sampled power spectral density function and searching for bins where the at least one sampled-autocorrelation function or the sampled power spectral density function exceeds a threshold that, normally, would not be present without the intentional global positioning system interference.

2. The system of claim 1 wherein an alert is displayed to a user upon detection of the intentional global positioning system interference.

3. The system of claim 1 wherein the interface comprises a Link 16 tactical data network.

4. The system of claim 1 wherein the system is incorporated into at least one of a mobile warfighting unit and a stationary warfighting unit.

5. The system of claim 1 wherein the system is incorporated into a civilian airliner.

6. The system of claim 1 wherein an Integrated Data Registration software is stored on the memory storage device and is used to provide a medium for the instructions that cause the processor to compute the at least one sampled-autocorrelation function for determining the intentional global positioning system interference.

7. The system of claim 1 wherein the intentional global positioning system interference is from jamming or spoofing.

8. A method for determining a presence of interference the method comprising:
    providing at least one processor in a positioning system, wherein the processor is coupled to memory having instructions for determining the presence of the interference by performing:
    monitoring global positioning system data received by a global positioning system receiver under conditions in which interference is not present;
    storing the data for analysis and
    at a later time, comparing the global positioning system data, over a period of time, with a position output of an inertial navigation system using at least one sampled-autocorrelation function to determine the presence of error characteristics indicating global positioning system interference, wherein using the auto-correlation function comprises searching a plurality of bins where the at least one sampled-autocorrelation function or a sampled power spectral density function exceeds a threshold that, normally, would not be present without the global positioning system interference.

9. The method of claim 8 wherein the error characteristics indicating interference comprise a shifting in time of regularly reoccurring minima and maxima in the data.

10. The method of claim 8 wherein the comparing the data comprises computing at least one sampled-autocorrelation function for determining the presence of interference, based on a comparison of inertial navigation system provided positions and global positioning system provided positions at various times.

11. The method of claim 8 wherein the error characteristics indicating interference comprise deterministic qualities of the inertial navigation system data.

12. The method of claim 11 wherein the deterministic qualities comprise earth-loop errors.

13. The method of claim 8 wherein error models of inertial navigation system operation are used to define how the navigation system behaves under normal operating conditions and are used to observe when the system is operating abnormally.

14. A method for determining the presence of interference in a global positing system receiver, the method comprising:
provilding an inertial navigation system;
providing inertial navigation system position data that is differenced with a truth reference;
comparing the differenced data with the inertial navigation system position data;
evaluating a sampled power spectral density function or a sampled autocorrelation function for the computed position differences between the inertial navigation system position and the truth reference;
using data from either the sampled autocorrelation function or the sampled power spectral density function, and evaluating the data to detect the presence of interference.

15. The method of claim 14 wherein the sampled auto-correlation function is computed for both latitude and longitude.

16. The method of claim 15 wherein an equivalent frequency domain representation utilizes the sampled power spectral density functions for latitude and longitude.

17. The method of claim 14 wherein algorithms are used to compute at least one sampled autocorrelation function for the position errors of inertial navigation system position data based on the comparison of inertial navigation system position data with global positioning system position data.

18. The method of claim 14 wherein the truth reference is a global positioning system receiver and associated position data.

19. The method of claim 14 wherein evaluating the data to detect the presence of interference comprises binning the data and identifying bins where the sampled auto-correlation or sampled power spectral density functions exceed a threshold that, normally, would not be present without interference.

* * * * *